(12) United States Patent
Nishigori et al.

(10) Patent No.: US 12,167,055 B2
(45) Date of Patent: Dec. 10, 2024

(54) BIT STREAM GENERATION METHOD, ENCODING DEVICE, AND DECODING DEVICE

(71) Applicant: SONY GROUP CORPORATION, Tokyo (JP)

(72) Inventors: Shuichiro Nishigori, Tokyo (JP); Hirofumi Takeda, Tokyo (JP); Takahiro Watanabe, Tokyo (JP); Shiro Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/905,184

(22) PCT Filed: Jan. 28, 2021

(86) PCT No.: PCT/JP2021/003093
§ 371 (c)(1),
(2) Date: Aug. 29, 2022

(87) PCT Pub. No.: WO2021/176904
PCT Pub. Date: Sep. 10, 2021

(65) Prior Publication Data
US 2023/0122545 A1    Apr. 20, 2023

(30) Foreign Application Priority Data
Mar. 5, 2020  (JP) .................. 2020-037687

(51) Int. Cl.
*H04N 21/236*    (2011.01)
*H04N 21/235*    (2011.01)
(Continued)

(52) U.S. Cl.
CPC ... *H04N 21/23614* (2013.01); *H04N 21/2355* (2013.01); *H04N 21/4348* (2013.01); *H04N 21/4355* (2013.01); *H04N 21/44209* (2013.01)

(58) Field of Classification Search
CPC ......... H04N 21/23614; H04N 21/2355; H04N 21/4348; H04N 21/4355; H04N 21/44209
See application file for complete search history.

(56) References Cited

U.S. PATENT DOCUMENTS

| 2010/0145713 | A1* | 6/2010 | Carroll | G10L 19/167 |
| | | | | 370/476 |
| 2014/0126495 | A1* | 5/2014 | Kubota | H04W 72/23 |
| | | | | 370/329 |

(Continued)

FOREIGN PATENT DOCUMENTS

| JP | 62-178032 A | 8/1987 |
| JP | 03-210845 A | 9/1991 |

(Continued)

OTHER PUBLICATIONS

International Search Report and Written Opinion of PCT Application No. PCT/JP2021/003093, issued on Apr. 27, 2021, 09 pages of ISRWO.

*Primary Examiner* — Joshua D Taylor
(74) *Attorney, Agent, or Firm* — CHIP LAW GROUP

(57) ABSTRACT

As a bit stream generation method for generating a bit stream of transmission data in which a plurality of signals including at least a tactile signal is multiplexed, a signal transmission unrequired section of the tactile signal is determined and, in a case where the signal transmission unrequired section exists, the bit stream in which additional information other than the tactile signal is inserted into the signal transmission unrequired section is generated.

9 Claims, 17 Drawing Sheets

(51) Int. Cl.
  *H04N 21/434* (2011.01)
  *H04N 21/435* (2011.01)
  *H04N 21/442* (2011.01)

(56) References Cited

U.S. PATENT DOCUMENTS

2014/0233552 A1* 8/2014 Nojiri .................. H04B 7/0615
  370/338
2014/0347177 A1* 11/2014 Phan ..................... A63F 13/285
  340/407.1
2016/0212435 A1* 7/2016 Tsukagoshi ........ H04N 21/8451

FOREIGN PATENT DOCUMENTS

| JP | 2004-219914 A | 8/2004 |
|----|---------------|--------|
| JP | 2014-239430 A | 12/2014 |

\* cited by examiner

BIT STREAM GENERATION METHOD, ENCODING DEVICE, AND DECODING DEVICE

CROSS REFERENCE TO RELATED APPLICATIONS

This application is a U.S. National Phase of International Patent Application No. PCT/JP2021/003093 filed on Jan. 28, 2021, which claims priority benefit of Japanese Patent Application No. JP 2020-037687 filed in the Japan Patent Office on Mar. 5, 2020. Each of the above-referenced applications is hereby incorporated herein by reference in its entirety.

TECHNICAL FIELD

The present technology relates to a bit stream generation method, an encoding device, and a decoding device, and particularly relates to a technology for transmitting a plurality of signals including a tactile signal.

BACKGROUND ART

In recent years, a technology has been developed in which a device worn by a user vibrates to give a tactile stimulus to the user. Here, the tactile stimulus refers to a physical phenomenon that causes the user to feel a tactile sensation by a vibration phenomenon or the like. In addition, generating a tactile stimulus will be referred to as tactile presentation.

A technology for performing tactile presentation is used in devices in various fields.

For example, in a terminal device including a touch panel such as a smartphone, a touch panel or a housing vibrates in response to a touch operation from a user and gives a tactile stimulus to a user's finger, so that a touch feeling on a button or the like displayed on the touch panel can be expressed.

Furthermore, for example, in a music listening device such as headphones, a heavy bass sound in music being reproduced can be emphasized by giving a tactile stimulus in accordance with the music reproduction.

Furthermore, for example, in a device that provides a computer game, virtual reality (VR), or the like, the user's sense of immersion in the content can be improved by reproducing a sound and vibrating a controller or the like to give a tactile stimulus in accordance with an operation using the controller or a scene of the content.

In addition, a technology of giving a tactile stimulus to a user on the basis of a tactile signal received from an external device has been developed. For example, Patent Document 1 below discloses a technique of giving a tactile stimulus to a user while changing the frequency and amplitude of vibration on the basis of a received signal.

CITATION LIST

Patent Document

Patent Document 1: Japanese Patent Application Laid-Open No. 2004-219914

SUMMARY OF THE INVENTION

Problems to be Solved by the Invention

Incidentally, in a case of reproducing sound and vibration by using a device as described above, wireless implementation is desired because wired implementation is complicated. For example, in a case where implementation in near-field wireless communication such as Bluetooth (registered trademark) is considered, an acoustic signal and a vibration signal are encoded in synchronization and then transmitted to a reproducing device. However, in current audio wireless communication, it is necessary to perform transmission by efficiently store data in a communication packet. Therefore, the frame size, which is the minimum processing unit of the encoded data, is generally a fixed length (that is, a fixed bit rate). The vibration signal is a one-dimensional signal similarly to the acoustic signal, and it is inevitable that the frame size is also encoded with a fixed length.

In current audio wireless communication, since encoding and transmission are performed in a limited communication band, there is a problem that sound interruption due to packet loss caused by deterioration of the communication condition occurs, and in order to further add and transmit a tactile signal in this situation, it is necessary to further improve the efficiency of communication in addition to information compression of the tactile signal.

Furthermore, there has been no means to freely and effectively use information effective for the user outside the range of the standard, and there has been a limitation on how to enjoy various applications.

Therefore, an object of the present technology is to enable efficient and effective use of communication by focusing on characteristics of a plurality of signals including a tactile signal (for example, an audio signal and a tactile signal) when wirelessly communicating the signals.

Solutions to Problems

A bit stream generation method according to the present technology is a bit stream generation method for generating a bit stream of transmission data in which a plurality of signals including at least a tactile signal is multiplexed, and includes determining a signal transmission unrequired section of the tactile signal and, in a case where the signal transmission unrequired section exists, generating the bit stream in which additional information other than the tactile signal is inserted into the signal transmission unrequired section.

For example, in a case where it is assumed that an audio signal and a tactile signal are multiplexed and transmitted, the audio signal is often a signal indicating continuous sound information when considered in a time axis direction, but the tactile signal is rarely a continuous signal. Therefore, in a case where the minimum processing unit of the encoded data has a fixed length (fixed bit rate), a section in which signal transmission is not required occurs in the bit stream. Therefore, for example, additional information is inserted into such a signal transmission unrequired section.

Note that, the "section" may refer to a range in a time axis direction or may refer to a bit range in an encoding format.

In the above-described bit stream generation method according to the present technology, a case where the signal transmission unrequired section is a section where the tactile signal is determined to be an imperceptible signal can be considered.

For example, a section in which the tactile signal is a non-signal or a section in which the amplitude level of the tactile signal is small and cannot be perceived by a person is defined as the signal transmission unrequired section.

In the above-described bit stream generation method according to the present technology, a case where the signal transmission unrequired section is a bit section that has become a surplus area as a result of encoding the tactile signal can be considered.

At the time of encoding a tactile signal, there is a case where the encoded data is generated at a small data amount with respect to the data length of the minimum processing unit (for example, a frame) having a fixed length due to a difference in encoding efficiency. In that case, the surplus area is usually used as padding or the like. The bit section serving as the surplus area is set as the signal transmission unrequired section.

In the above-described bit stream generation method according to the present technology, a case where the additional information inserted into the signal transmission unrequired section is encoded data of another signal to be multiplexed with the tactile signal in a minimum processing unit that is at a later time point in a time axis direction than a minimum processing unit to which the signal transmission unrequired section corresponds can be considered.

That is, encoded data of another signal (for example, an audio signal) of the minimum processing unit (for example, the next frame) at a later time point is inserted into the signal transmission unrequired section of the tactile signal at an earlier time point.

In the above-described bit stream generation method according to the present technology, a case where the additional information is text data or image data can be considered.

For example, text data or image data for presenting some information is inserted into the signal transmission unrequired section of the tactile signal.

In the above-described bit stream generation method according to the present technology, a case where the additional information is correction data of a position or time can be considered.

For example, data for position correction, time correction, or the like of the device on the end user side is inserted into the signal transmission unrequired section of the tactile signal in advance.

In the above-described bit stream generation method according to the present technology, a case where a signal multiplexed with the tactile signal is an audio signal or an image signal can be considered.

That is, in a case of multiplexing an audio signal or an image signal with a tactile signal, a signal transmission unrequired section in the tactile signal is used for transmission of additional information.

An encoding device according to the present technology includes a signal encoding unit that encodes each of a plurality of signals including at least a tactile signal, an additional information encoding unit that determines a signal transmission unrequired section in encoded data of the tactile signal and encodes additional information other than the tactile signal and inserts the encoded additional information into the signal transmission unrequired section in a case where the signal transmission unrequired section exists, and a multiplexing unit that generates transmission data obtained by multiplexing a plurality of pieces of encoded data including the encoded data of the tactile signal to which the additional information has been inserted.

That is, the encoding device generates transmission data obtained by multiplexing a plurality of signals including the tactile signal after inserting the additional information into the signal transmission unrequired section of the tactile signal.

In the above-described encoding device according to the present technology, a case where presence/absence determination information indicating presence/absence of the additional information is added to the transmission data can be considered.

For example, information indicating whether or not the additional information is included is provided in the encoding format of the minimum processing unit (for example, frame).

A decoding device according to the present technology includes a demultiplexing unit that demultiplexes transmission data obtained by multiplexing encoded data of a plurality of signals including at least a tactile signal, an additional information determination unit that determines whether or not additional information is included in encoded data of the tactile signal obtained by the demultiplexing, and an additional information encoded data decoding unit that obtains the additional information by decoding the encoded data of the additional information in a case where it is determined that the additional information is included.

That is, in a case where the additional information is inserted into the signal transmission unrequired section of the tactile signal, the decoding device decodes the encoded data of the additional information.

In the above-described decoding device according to the present technology, a case where, if presence/absence determination information indicating presence/absence of the additional information is added to the transmission data, the additional information determination unit determines whether or not the additional information is included by using the presence/absence determination information can be considered.

For example, in a case where presence/absence determination information indicating whether or not additional information is included is provided in the encoding format of the minimum processing unit (for example, a frame), the presence/absence determination information is referred to.

MODE FOR CARRYING OUT THE INVENTION

Hereinafter, embodiments will be described in the following order.
<1. Audile/Tactile Recording/Reproducing System>
<2. Encoding Device>
<3. Audile/Tactile Transmission Device>
<4. Decoding Device>
<5. Specific Example of Audile/Tactile Recording/Reproducing System>
<6. Main Configuration of Audio Signal and Tactile Signal>
<7. Encoding Unit>
<8. Encoded Data>
<9. Encoding Processing>
<10. Decoding Unit>
<11. Decoding Processing>
<12. Conclusion and Modification Examples>

Note that terms used in the present disclosure are defined as follows.

Tactile stimulus: a physical phenomenon for causing a person to perceive a tactile sensation, such as a vibration phenomenon.

Tactile presentation: generating a tactile stimulus.

Tactile signal: a signal representing a pattern of a tactile stimulus, such as a signal representing a vibration waveform.

Tactile characteristics: characteristics related to a tactile sensation of a human, which depends on the site (hand, face, foot, etc.).

Encoded data: data obtained by encoding a signal. Streams and frames serve as more specific concepts.

Tactile encoded data: data obtained by encoding a tactile signal.

Audile/tactile encoded data: a generic term for data obtained by encoding an audio signal and data obtained by encoding a tactile signal.

<1. Audile/Tactile Recording/Reproducing System>

Figure 1:
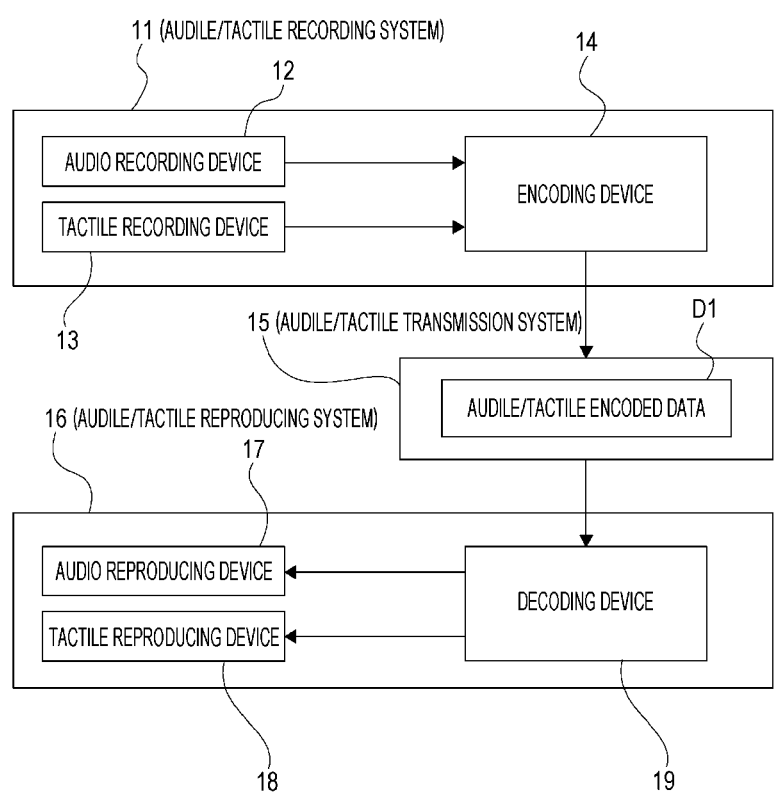
FIG. 1 is a block diagram of a system configuration according to an embodiment of the present technology.

A configuration of an audile/tactile recording/reproducing system of the present technology will be described with reference to FIG. 1. The audile/tactile recording/reproducing system of FIG. 1 includes an audile/tactile recording system 11, an audile/tactile transmission device 15, and an audile/tactile reproducing system 16.

The audile/tactile recording system 11 is a system that records and encodes an audio signal and a tactile signal. The audile/tactile recording system 11 includes an audio recording device 12, a tactile recording device 13, and an encoding device 14.

The audio recording device 12 converts sound into an audio signal by a microphone or the like.

The tactile recording device 13 converts vibration into a tactile signal by a tactile sensor, a tactile pickup, an acceleration sensor, or the like.

The encoding device 14 inputs an audio signal and a tactile signal, encodes the audio signal and the tactile signal according to a predetermined encoding method, and generates audile/tactile encoded data D1 as transmission data.

Note that a configuration in which a plurality of the audio recording devices 12 and a plurality of the tactile recording devices 13 are provided is also assumed.

The audile/tactile transmission device 15 transmits the audile/tactile encoded data D1 generated by the encoding device 14 to the audile/tactile reproducing system 16.

The audile/tactile reproducing system 16 reproduces the recorded audio signal and tactile signal as sound and vibration, respectively. The audile/tactile reproducing system 16 includes a decoding device 19, an audio reproducing device 17, and a tactile reproducing device 18.

The decoding device 19 generates an audio signal and a tactile signal by decoding the input audile/tactile encoded data D1 according to a predetermined encoding method.

The audio reproducing device 17 reproduces the input audio signal as sound via a speaker, a headphone, or the like.

The tactile reproducing device 18 reproduces the input tactile signal as vibration via a vibrator, an actuator, or the like.

<2. Encoding Device>

Figure 2:
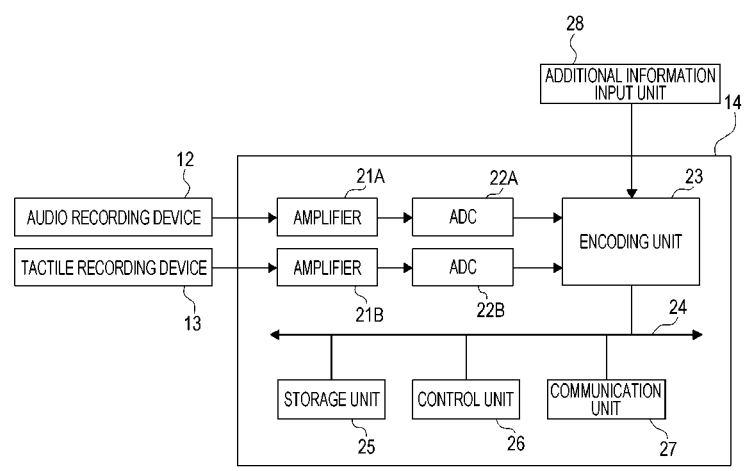
FIG. 2 is a block diagram of an encoding device according to the embodiment.

FIG. 2 illustrates an internal configuration example of the encoding device 14.

An encoding unit 23, a storage unit 25, a control unit 26, and a communication unit 27 are interconnected via a bus 24, and can perform data communication with each other.

The amplifier 21A amplifies the audio signal input from an audio recording device 12A. An ADC 22A is an analog digital converter, and converts an analog signal of an audio signal into a digital signal.

An amplifier 21B amplifies the tactile signal input from the tactile recording device 13. An ADC 22B, which is an analog digital converter, converts an analog signal of a tactile signal into a digital signal.

The encoding unit 23 encodes the input audio signal and tactile signal and additional information input from an additional information input unit 28 according to a predetermined encoding method, and generates the audile/tactile encoded data D1.

The additional information input unit 28 inputs additional information input from an external device to the encoding unit 23.

Note that the encoding of the tactile signal according to the present embodiment will be described later. Further, the additional information will be described later.

The control unit 26 includes a microcomputer including, for example, a central processing unit (CPU), a read only memory (ROM), a random access memory (RAM), and the like, and performs overall control of the encoding device 14 by executing processing according to a program stored in the ROM.

The storage unit 25 comprehensively represents storage devices such as a hard disk drive (HDD) and a solid state drive (SSD), and is used for storing various types of data in the encoding device 14.

For example, the storage unit 25 stores data necessary for control by the control unit 26. Furthermore, the audile/tactile encoded data D1 obtained by the encoding unit 23 can be stored in the storage unit 25 on the basis of the control by the control unit 26.

The communication unit 27 performs data communication with an external device on the basis of the control by the control unit 26. For example, the audile/tactile encoded data D1 obtained by the encoding unit 23 can be transmitted to the audile/tactile reproducing system 16.

<3. Audile/Tactile Transmission Device>

Figure 3:
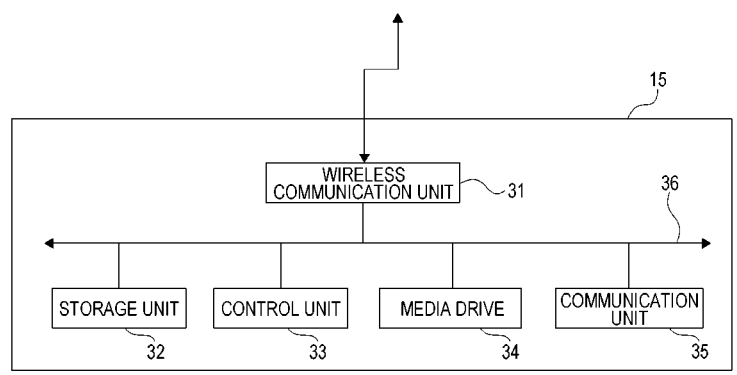
FIG. 3 is a block diagram of an audile/tactile transmission device according to the embodiment.

FIG. 3 illustrates an internal configuration example of the audile/tactile transmission device 15. A wireless communication unit 31, a storage unit 32, a control unit 33, a media drive 34, and a communication unit 35 are interconnected via a bus 36, and can perform data communication with each other.

The control unit 33 includes a microcomputer including a CPU, a ROM, a RAM, and the like, and performs overall control of the audile/tactile transmission device 15 by executing processing according to a program stored in the ROM.

The communication unit 35 is configured to be able to perform data communication with an external device via a network such as the Internet, a home network, a local area network (LAN), or a satellite communication network.

The control unit 33 can perform, via the communication unit 35, data communication with an external device connected to a network. In particular, the audile/tactile encoded data D1 can be received from an external device such as a server on the network via the communication unit 35.

The media drive 34 is configured such that a portable storage medium is attachable thereto and detachable therefrom, and is configured as a reader/writer unit capable of writing and reading data to and from the attached storage medium. Examples of the storage medium supported by the media drive include a portable flash memory and an optical disk storage medium. The media drive 34 enables reading of the audile/tactile encoded data D1 recorded in the portable storage medium.

The storage unit 32 comprehensively represents storage devices such as an HDD and an SSD, and is used for storing various types of data in the audile/tactile transmission device 15. For example, the storage unit 32 stores data necessary for control by the control unit 33.

Furthermore, the storage unit 32 can also store the audile/tactile encoded data D1 read by the media drive 34 and the audile/tactile encoded data D1 received from an external device by the communication unit 35 in the storage unit 32 on the basis of the control by the control unit 33.

The wireless communication unit 31 performs short-range wireless communication by a communication method such as Bluetooth (registered trademark).

Here, as part of the overall control described above, the control unit 33 performs control for causing the communication unit 35 to receive or the media drive 34 to read the audile/tactile encoded data D1.

Furthermore, the control unit 33 performs control to cause the wireless communication unit 31 to transmit the audile/tactile encoded data D1 obtained via the communication unit 35 or the media drive 34 to the decoding device 19.

<4. Decoding Device>

Figure 4:
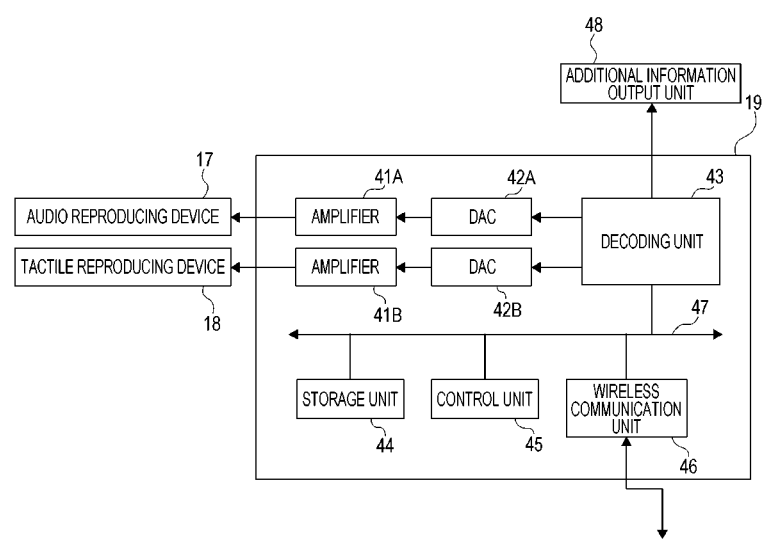
FIG. 4 is a block diagram of a decoding device according to the embodiment.

FIG. 4 illustrates an internal configuration example of the decoding device 19. A decoding unit 43, a storage unit 44, a control unit 45, and a wireless communication unit 46 are interconnected via a bus 47, and can perform data communication with each other.

The control unit 45 includes, for example, a microcomputer including a CPU, a ROM, a RAM, and the like, and performs overall control of the decoding device 19.

The wireless communication unit 46 performs near-field wireless communication by a method capable of communicating with the wireless communication unit 31 of the audile/tactile transmission device 15. Examples of the near-field wireless communication method include Bluetooth. In the decoding device 19, the audile/tactile encoded data D1 transmitted from the audile/tactile transmission device 15 is received by the wireless communication unit 46.

The storage unit 44 comprehensively represents storage devices such as an HDD and an SSD, and is used for storing various types of data in the decoding device 19. For example, the storage unit 44 stores data necessary for control by the control unit 45.

The decoding unit 43 decodes the audile/tactile encoded data D1 input via the wireless communication unit 46 by a method described later to obtain an audio signal and a tactile signal.

A DAC 42A is a digital analog converter, and converts a digital signal of an audio signal into an analog signal. An amplifier 41A amplifies the audio signal, and outputs the audio signal to the audio reproducing device 17.

A DAC 42B, which is a digital analog converter, converts a digital signal of a tactile signal into an analog signal. An amplifier 41B amplifies the tactile signal, and outputs the tactile signal to the tactile reproducing device 18.

An additional information output unit 48 outputs additional information decoded by the decoding unit 43 to an external device. This additional information is the additional information input by the additional information input unit 28 in FIG. 2 and inserted into the audile/tactile encoded data D1.

<5. Specific Example of Audile/Tactile Recording/Reproducing System>

Figure 5:
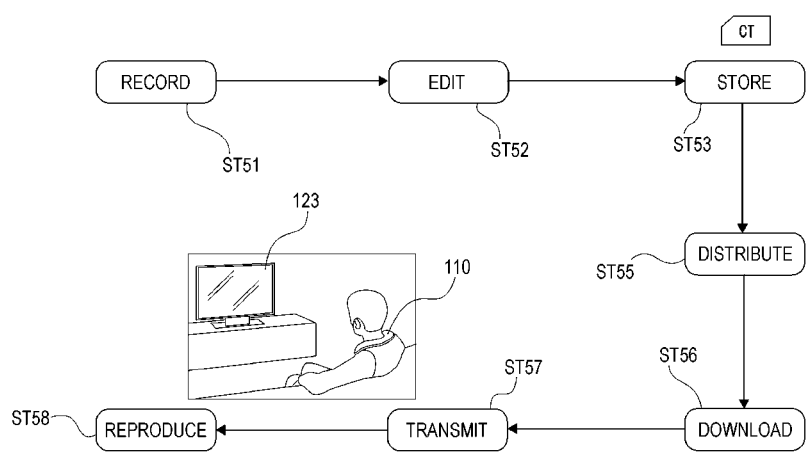
FIG. 5 is an explanatory diagram of an outline from audile/tactile recording to reproduction according to the embodiment.

As an example of actually using the audile/tactile recording system 11 and the audile/tactile reproducing system 16 described above, production, distribution, and user's reproduction of a vibration-incorporating video content CT are illustrated in FIG. 5.

In FIG. 5, a content producing company records (ST51) a video, a sound, and a vibration of a movie, a drama, or the like using a video camera and the audile/tactile recording system 11.

Thereafter, editing (ST52) is performed offline. Examples of the editing work include cutting and pasting of video, mixing of sound and vibration, and the like.

After the editing, the completed vibration-incorporating video content CT is recorded (ST53) as data.

The recorded vibration-incorporating video content CT is stored in the server, and is distributed (ST55) by a distribution company so as to be downloaded to a reception device and reproduced on demand by the user.

When the user views the vibration-incorporating video content CT, the user accesses the server described above and downloads a content that they like to a reception device such as a television device 123 (ST56).

At the time of reproduction, the reproduction may be performed after all the content data has been downloaded to the reception device, or the reproduction may be performed via streaming.

At the time of reproduction, the video is reproduced by a television device, and audio and vibration are wirelessly transmitted (ST57) from the television device 123 to a wearable speaker 110 worn by the user, for example, and reproduced (ST58).

The wearable speaker 110 is, for example, an active vibration headphone or an active vibration wearable speaker.

Figure 6:
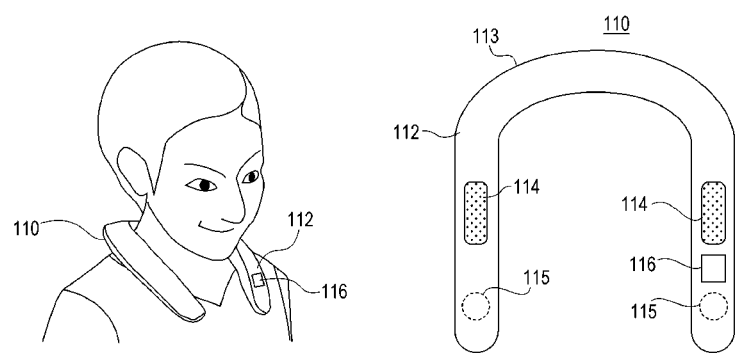
FIG. 6 is an explanatory diagram of a wearable speaker according to the embodiment.

FIG. 6 illustrates an example of an active vibration wearable speaker as the wearable speaker 110. FIG. 6 illustrates an upper surface of a main body 112 of the wearable speaker 110 and a wearing state of the user.

In use, a housing 113 of the main body 112 formed in an approximate U shape is used by being hung on a shoulder as illustrated in the drawing.

Sound is reproduced from a speaker 114 that reproduces sound, and a vibrator 115 mounted on the back side of the housing 113 vibrates to tactilely stimulate the vicinity of the clavicle of the user.

In addition, a small monitor 116 is provided in the vicinity of the speaker 114, and can display the state of the device such as the remaining battery level or information received by communication with an external device.

Such a vibration-incorporating video content CT includes a vibration signal together with an audio signal and a video signal, and these are multiplexed and transmitted. In this case, in the present technology, additional information is inserted into the vibration signal as described below.

Note that, in the configuration and processing of the present embodiment, in order to simplify the description, the description is given focusing on the audio signal and the vibration signal without referring to the video signal.

<6. Main Configuration of Audio Signal and Tactile Signal>

Figure 7:
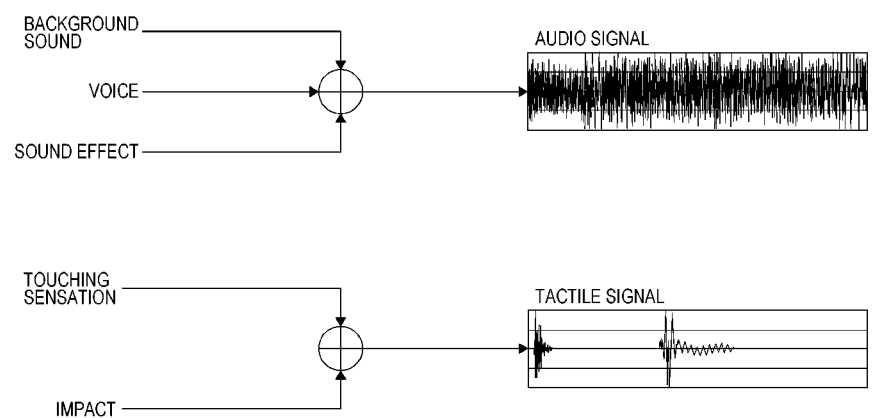
FIG. 7 is an explanatory diagram of an audio signal and a tactile signal.

FIG. 7 illustrates main configurations of an audio signal and a tactile signal in the audile/tactile encoded data D1 serving as transmission data of the vibration-incorporating video content CT or the like.

The audio signal generally includes a background sound such as an environmental sound, an instrumental sound, or a song, a voice such as a line or a narration of a character, and an additional sound effect for enhancing content. Therefore, the audio signal does not become no-signal (silence) in most scenes of the content like the waveform illustrated in FIG. 7.

On the other hand, the tactile signal includes, for example, a vibration signal expressing a sensation of a character touching an object or an impact of collision of an object. Generally, tactile stimulus is often used only in characteristic scenes for effective use. Furthermore, if the user feels vibration all the time, the user may feel uncomfortable or their health may be impaired. Therefore, the tactile signal is not always generated like a sound.

Therefore, the tactile signal is an intermittent signal in which a non-signal continues for a while after a short-time signal is generated as in the illustrated waveform.

<7. Encoding Unit>

Details of the encoding unit 23 (see FIG. 2) in the encoding device 14 will be described with reference to FIG. 8.

In the encoding unit 23, audio signals and tactile signals of a predetermined number of channels are input for a predetermined number of samples for each channel. In the following description, it is assumed that similar processing is performed for each channel.

A signal input unit 71 cuts each of the input audio signal and tactile signal into certain processing block units (the number of time samples), and thereafter, processing is performed on each of these processing block units.

A signal encoding unit 72 encodes the input signal according to a predetermined encoding method, and outputs encoded data.

Note that examples of encoding methods for audio signals include MPEG-1 audio layer-III (MP3) and advanced audio coding (AAC) as general audio encoding methods.

In addition, since the tactile signal is a one-dimensional signal similarly to the audio signal, an audio encoding method may be used as an encoding method, and since the tactile signal can be expressed in a band of about 1 kHz (sampling frequency: 2 kHz) in consideration of human tactile characteristics, linear pulse code modulation (LPCM), adaptive differential pulse code modulation (ADPCM), or the like may be used in a case where the number of channels is small.

An additional information encoding unit 73 determines a section where the additional information can be inserted in the encoded data encoded by the signal encoding unit 72. Then, in a case where it is determined that there is no section where the additional information can be inserted, the additional information is passed and the encoded data is output to a multiplexing unit 74.

In contrast, in a case where it is determined that there is a section where the additional information can be inserted, the additional information input from the additional information input unit 28 or additional information to be described later that is input at the time of audio signal encoding is encoded by the additional information encoding unit 73, and is then inserted into a surplus portion of the encoded data determined as the insertable section or is recorded as a substitute for the encoded data. Note that the section into which the additional information encoded data can be inserted and the type of the additional information will be described later.

The multiplexing unit 74 multiplexes the encoded data of the audio signal, the encoded data of the tactile signal, and the encoded data of the additional information input from the additional information encoding unit 73 according to a predetermined encoded data format, and outputs the audile/tactile encoded data D1. Note that the encoded data format will be described later.

<8. Encoded Data>

Here, the additional information encoded data will be described first.

Figure 9A:
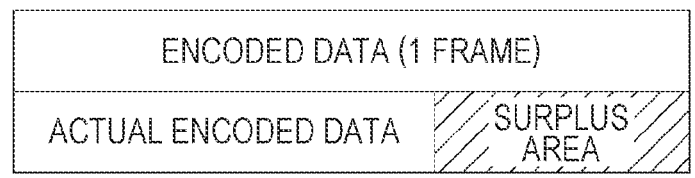
FIGS. 9A and 9B are explanatory diagrams of a signal transmission unrequired section according to the embodiment.
Figure 9B:
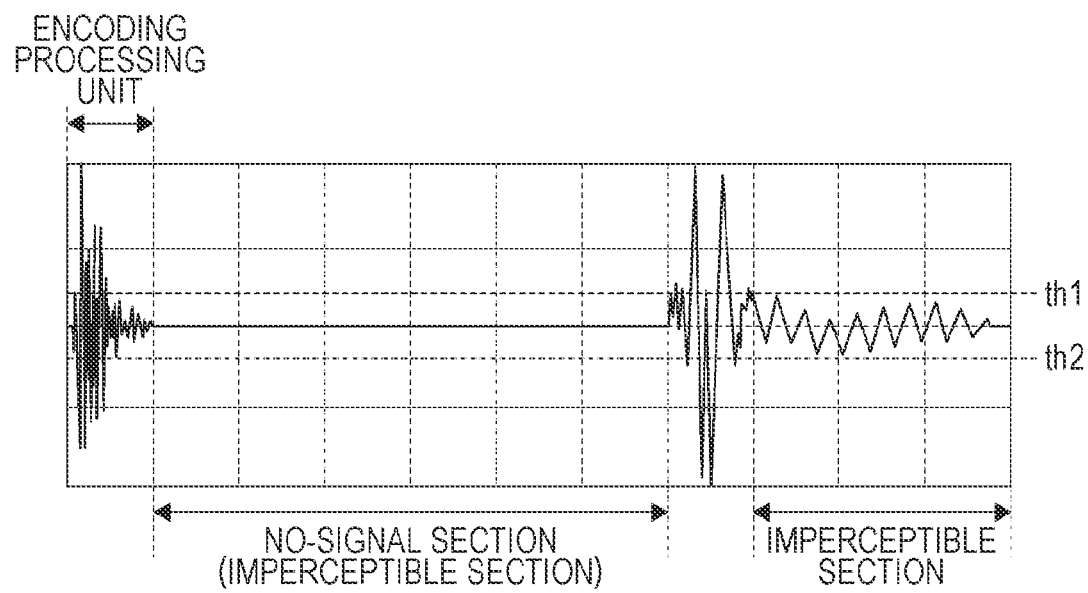

The following cases illustrated in FIGS. 9A and 9B can be considered as a section in which the additional information encoded data is inserted.

First, as illustrated in FIG. 9A, there is a section as an encoding surplus area that occurs when the frame size of the encoded data is fixed (fixed bit rate) and the encoding efficiency is high. Since the amount of data after encoding varies depending on the encoding efficiency of the data, a surplus area may occur in formatting with a fixed frame size. This surplus area is a section where the additional information can be inserted.

Furthermore, as illustrated in FIG. 9B, a section (non-signal section) in which the signal of the encoding processing unit (section corresponding to one frame of encoding) is a non-signal, or a section (imperceptible section) in which the user cannot perceive audile sensation or tactile sensation is also a section where the additional information can be inserted.

Note that the non-signal section is also imperceptible, and is thus included in the imperceptible section.

Here, the imperceptible section will be described with reference to FIGS. 10A and 10B.

Figure 10A:
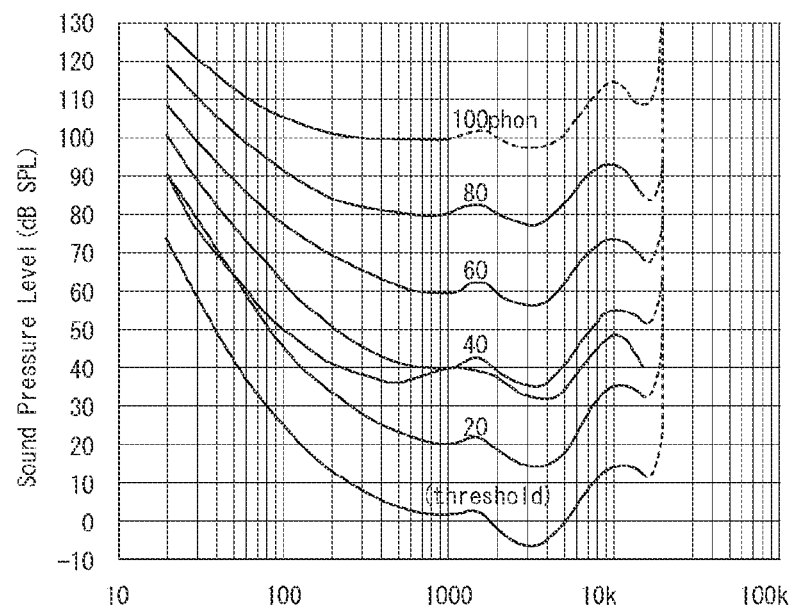
FIGS. 10A and 10B are explanatory diagrams of an equal loudness contour in human auditory sense and a vibration detection threshold curve in human tactile sense.

FIG. 10A illustrates an equal loudness contour in human hearing with a vertical axis representing a sound pressure level and a horizontal axis representing a frequency, and a graph displayed at the bottom represents a minimum audible value. Sound with a sound pressure level below the minimum audible value at each frequency is imperceptible.

Figure 10B:
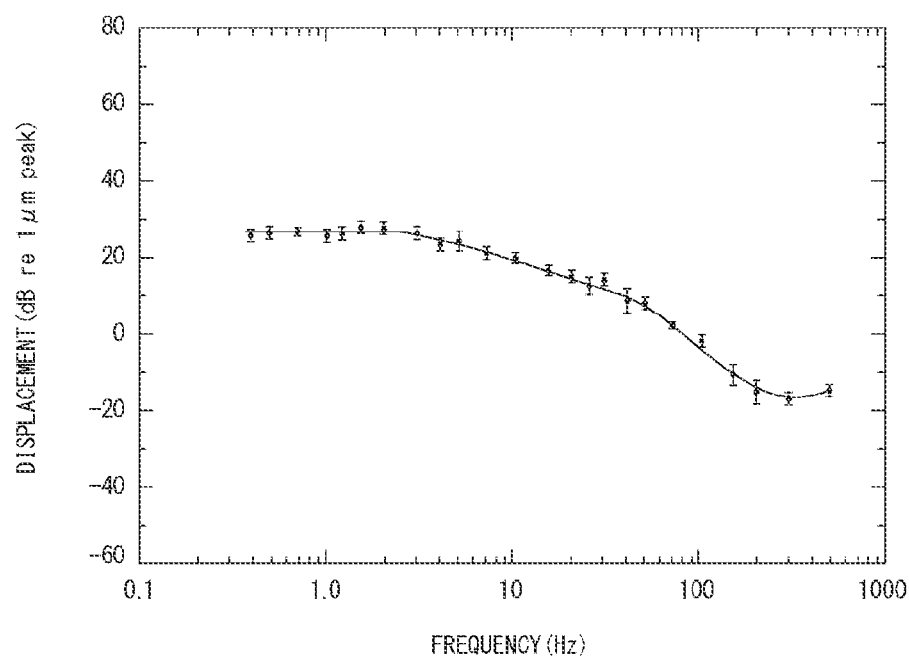

FIG. 10B illustrates a vibration detection threshold curve in a human tactile sense, and a vibration having an amplitude below a detection threshold at each frequency is imperceptible.

A time section determined to be imperceptible may be determined as the imperceptible section by using the indices as described above.

Alternatively, more simply, thresholds th1 and th2 may be set as illustrated in FIG. 9B, and a section in which the signal amplitude is within a range of the thresholds th1 and th2 may be set as the imperceptible section.

Note that the additional information encoded data cannot be necessarily transmitted every frame and is intermittent due to its nature, and therefore information that is not expected to be regularly transmitted at regular time intervals is used as the additional information.

Although FIG. 10A described above is a description for the imperceptible section of the audio signal, in the present embodiment, the additional information is inserted mainly into the imperceptible section of the tactile signal. However, inserting the additional information into the imperceptible section of the audio signal can be also considered as a modification example.

Note that, as can be seen from the above examples of FIGS. 10A and 10B, the "section" in the present disclosure may refer to a range in a time axis direction or may refer to a bit range in an encoding format.

Next, various examples of the additional information will be described.

As an example of the additional information, redundant data as a countermeasure against packet loss of an audio signal can be considered.

Figure 11:
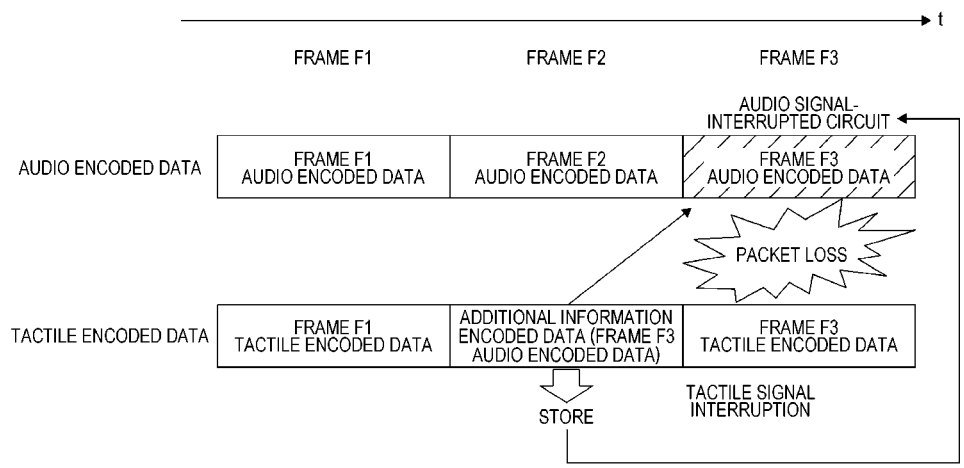

FIG. 11 illustrates time series of audio encoded data and tactile encoded data.

In this case, an example is described in which each encoded data of audio and tactile sense is transmitted in the frame F1, and in a frame F2, the audio encoded data of the next frame (frame F3) is transmitted as the additional information encoded data of the tactile encoded data.

The additional information encoded data is stored until the data of the next frame arrives successfully. It is assumed that thereafter, packet loss occurs in the frame F3 due to deterioration of the communication condition or the like, and the data of the frame F3 is not transmitted.

In this case, although tactile signal interruption occurs, audio signal interruption is avoided by using the audio encoded data of the frame F3 received and stored in advance as a substitute. Although the influence of slight occurrence of the interruption of the tactile signal on the user's perception is small, the interruption of the sound causes a sense of discomfort to a great extent. Therefore, it is effective as an audile/tactile recording/reproducing system that the audio signal interruption can be avoided.

Such additional information is not guaranteed to be transmitted every frame, but can reduce the probability of sound interruption.

Furthermore, as an example of the additional information, text/image data can be considered.

Figure 12:
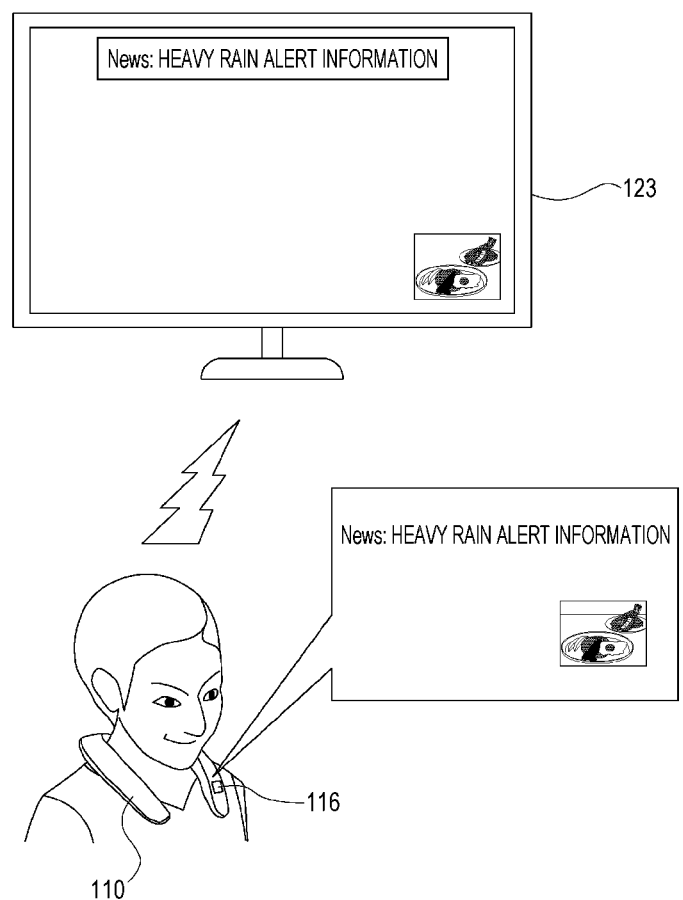

For example, as illustrated in FIG. 12, when the television device 123 and the wearable speaker 110 perform audile/tactile reproduction, on a screen of the television device 123 or the small monitor 116 of the wearable speaker 110, information of real-time breaking news or user customization is displayed as text, or information such as a slide show of pictures uploaded via a social networking service (SNS) is displayed, separately from video data. As a result, it is possible to present necessary and sufficient information with low-frequency update.

Furthermore, as an example of the additional information, correction data of time/position information can be considered.

For example, in a case where control (for example, control of localization of sound by position, automatic volume adjustment by time, and the like) according to a position and time is performed when using the wearable speaker 110, it is difficult to install a positioning function using a radio wave of a global positioning system (GPS) satellite, a standard radio wave receiving function from a standard radio tower, or a time alignment function by communication with a network time protocol (NTP) server in consideration of cost, labor, and accuracy of setting, and the like.

Figure 13:
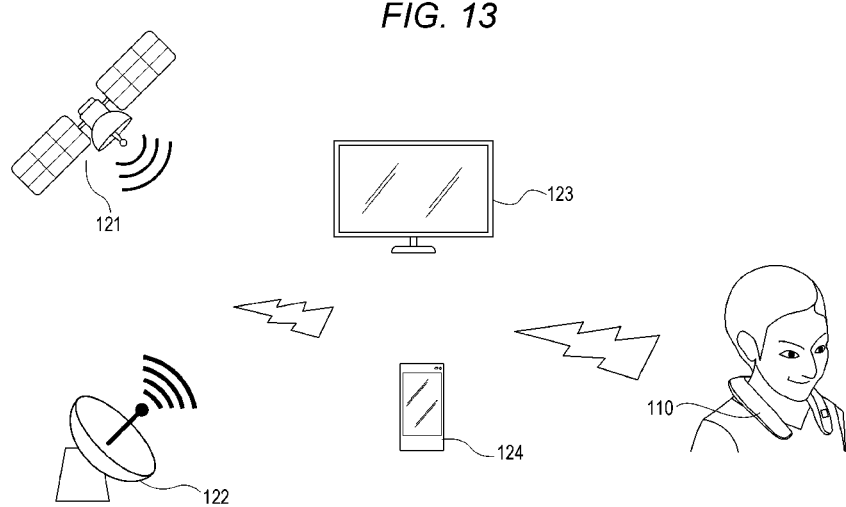

Therefore, as illustrated in FIG. 13, position information and time information transmitted from a GPS satellite 121 and a standard radio tower/NTP server 122 are received by, for example, the television device 123 or a smartphone 124, and the information is transmitted to the wearable speaker 110 as the additional information.

In this way, it is possible to use the time/position information as necessary and sufficient information with low-frequency update.

Next, an encoded data format will be described.

Figure 14:
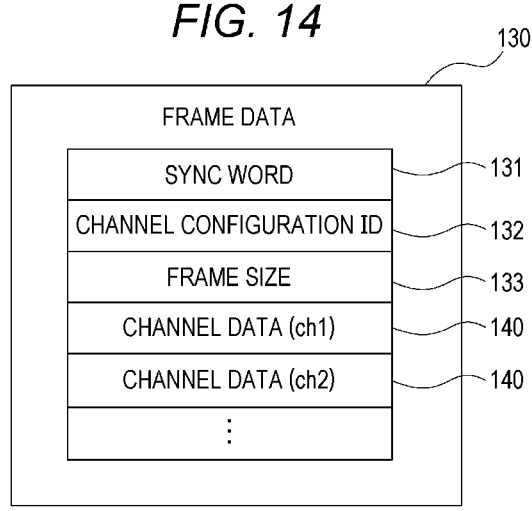

FIG. 14 illustrates a format of frame data 130 for one frame of the audile/tactile encoded data D1 encoded by the encoding unit 23.

A sync word 131 is an identification code representing a frame head, and a bit string that is not included in other data as much as possible is recorded.

In a channel configuration ID 132, a pattern ID of all channel configurations of the audio encoded data and the tactile encoded data is recorded.

Examples of the channel configuration ID include 0: monaural sound, 1: stereo sound, 2: monaural sound+monaural tactile sense, 3: stereo sound+monaural tactile sense, and 4: stereo sound+stereo tactile sense.

In a frame size 133, the number of bytes of the entire frame data 130 is recorded.

As channel data 140, encoded data of an audio signal or a tactile signal of each channel (ch1, ch2) is recorded. When the number of channels is three or more, channel data is further continuously recorded.

Figure 15:
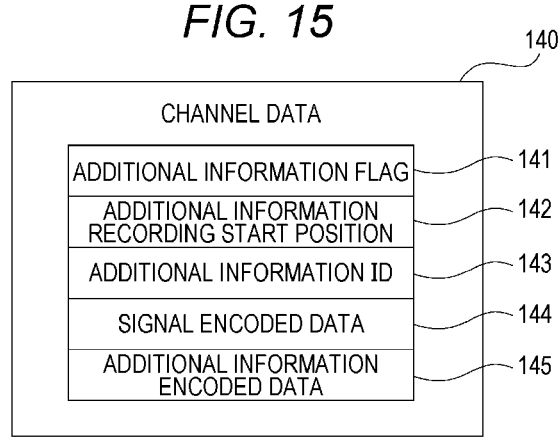

Details of one channel of each channel data 140 are illustrated in FIG. 15.

In an additional information flag 141, whether or not the additional information is included in the channel data is recorded with 1 bit. Examples of the flag include 0: no additional information, and 1: additional information.

In additional information recording start position 142, the position where switching from signal encoded data 144 to the additional information is performed and recording is started in the channel data 140 is recorded by the number of bytes from the head of channel data 140. Note that in a case where there is no additional information, the additional information recording start position 142 is not recorded.

In additional information ID 143, a pattern of the type of the additional information included in the channel data 140 is recorded.

Examples of additional information ID 143 include 0: audio encoded data of the next frame, 1: text data, 2: image data, 3: time correction data, and 4: position correction data. Note that in a case where there is no additional information, the additional information ID 143 is not recorded.

As signal encoded data 144, encoded data obtained by encoding an audio signal or a tactile signal is recorded.

Note that in a case where the signal encoded data 144 does not exist in the channel data 140 (in a case where the additional information recording start position 142 is "0"), the signal encoded data 144 is not recorded.

As additional information encoded data 145, encoded data obtained by encoding the additional information designated by the additional information ID 143 is recorded.

Note that in a case where the additional information encoded data does not exist in the channel data 140 (in a case where the additional information flag 141 is "0"), the additional information encoded data is not recorded.

For example, by performing encoding in the above-described format, it is possible to transmit effective additional information without affecting the quality of a signal even in narrowband communication.

<9. Encoding Processing>

Figure 8:
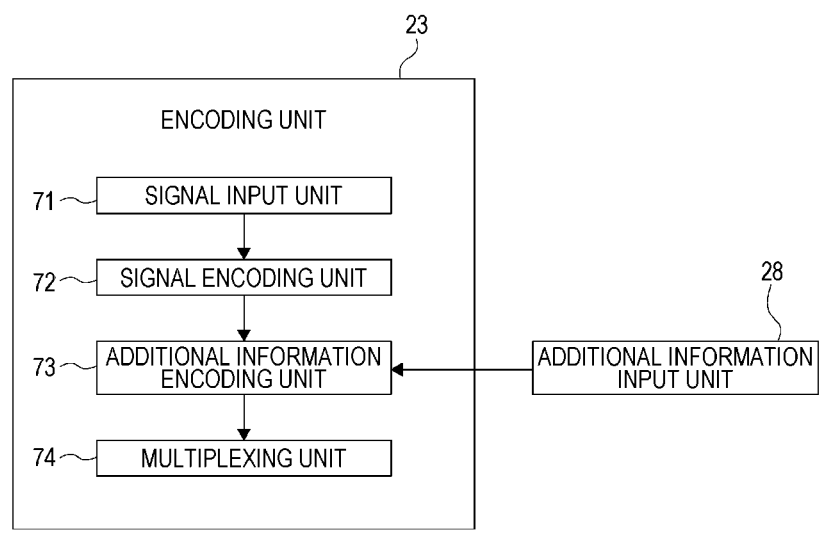
FIG. 8 is a block diagram of an encoding unit according to the embodiment.
Figure 16:
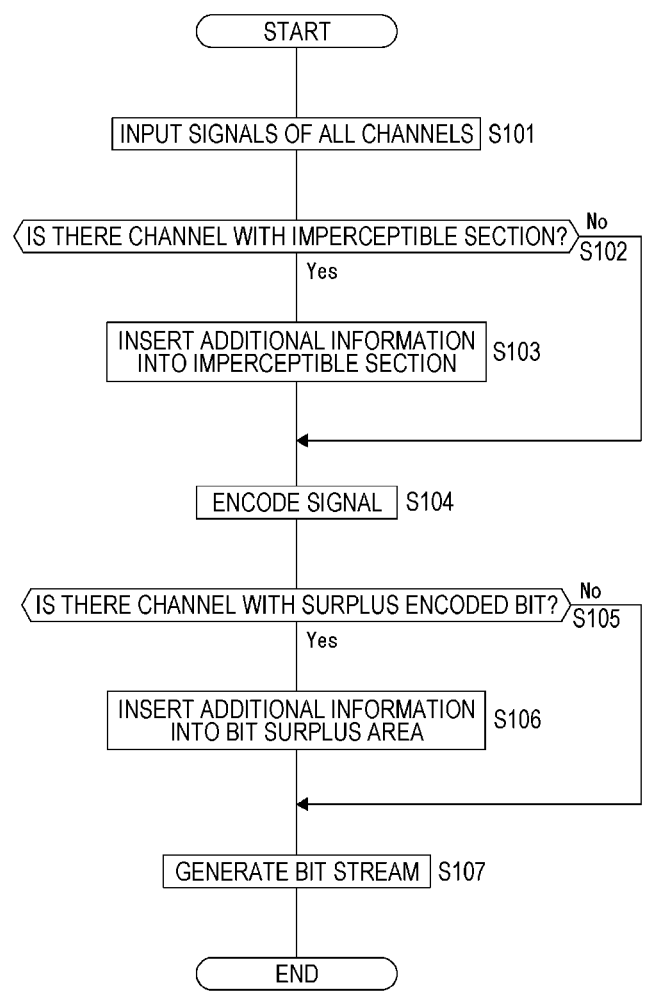

FIG. 16 illustrates a flowchart of encoding processing for generating the audile/tactile encoded data D1 for one frame, which is executed in the configuration of the encoding unit 23 illustrated in FIG. 8.

In step S101, the encoding unit 23 inputs a signal cut out by the number of samples for one frame for all channels.

In step S102, the encoding unit 23 performs signal analysis for each channel, and determines whether or not there is a channel having an imperceptible section as described in FIG. 9B.

If there is an imperceptible section, the encoding unit 23 records "1" in the additional information flag 141, records the position where the imperceptible section starts (the number of bytes from the head of the channel data 140) as the additional information recording start position 142 in the channel data 140, and proceeds to step S103.

If there is no imperceptible section, the encoding unit 23 proceeds to step S104.

In step S103, on the basis of the data input from the additional information input unit 28, the encoding unit 23 records the type ID of the additional information as the additional information ID 143, and records the encoded additional information as the additional information encoded data 145 starting from the additional information start position.

In step S104, the encoding unit 23 encodes the signal of each channel according to a predetermined encoding method, and records the encoded signal as the signal encoded data 144.

In step S105, the encoding unit 23 determines whether or not there is a channel in which bits are surplus at the time of encoding each channel.

If there is a surplus area as illustrated in FIG. 9A, the encoding unit 23 records "1" in the additional information flag 141, records the position where the bit surplus area starts (the number of bytes from the head of the channel data 140) as the additional information recording start position 142 in the channel data 140, and proceeds to step S106.

When there is no surplus area, the encoding unit 23 proceeds to step S107.

In step S106, on the basis of the data input from the additional information input unit 28, the encoding unit 23 records the type ID of the additional information as the additional information ID 143, and records the encoded additional information as the additional information encoded data 145 starting from the additional information start position.

In step S107, the encoding unit 23 records the sync word 131, the channel configuration ID 132, and the frame size 133, and generates a bit stream for one frame.

In the case of this processing example, the presence or absence of the imperceptible section is checked in step S102, and the surplus area is checked in step S105, so that the signal transmission unrequired section is determined twice in the processing of one frame. That is, an opportunity to insert additional information occurs twice per frame, so that as many additional information insertion opportunities are easily obtained.

<10. Decoding Unit>

Next, details of the decoding unit 43 (see FIG. 4) in the decoding device 19 will be described with reference to FIG. 17.

An encoded data input unit 61 inputs one frame of the input audile/tactile encoded data D1. Note that the head of one frame is determined from the sync word 131.

A demultiplexing unit 62 acquires each piece of information according to the encoded data format of FIG. 14.

An additional information determination unit 63 refers to the additional information flag 141 of the frame data 130 in the encoded data format to determine whether or not the additional information is included.

A signal encoded data decoding unit 64 decodes a signal from the signal encoded data 144 of each channel.

An additional information encoded data decoding unit 65 decodes the additional information from the additional information encoded data 145 of each channel.

A signal output unit 66 outputs the signal decoded by the signal encoded data decoding unit 64 to the DACs 42A and 42B (see FIG. 4).

An additional information processing unit 67 outputs the additional information decoded by additional information encoded data decoding unit 65 to the additional information output unit 48 (see FIG. 4).

Note that the additional information may be used in the signal encoded data decoding unit 64. For example, there is a case where spare audio data is inserted as the additional information as in the example of FIG. 11.

<11. Decoding Processing>

Figure 17:
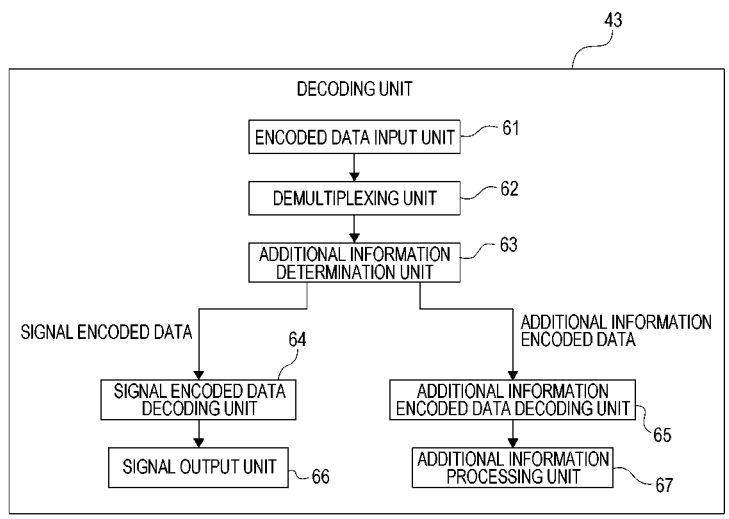
Figure 18:
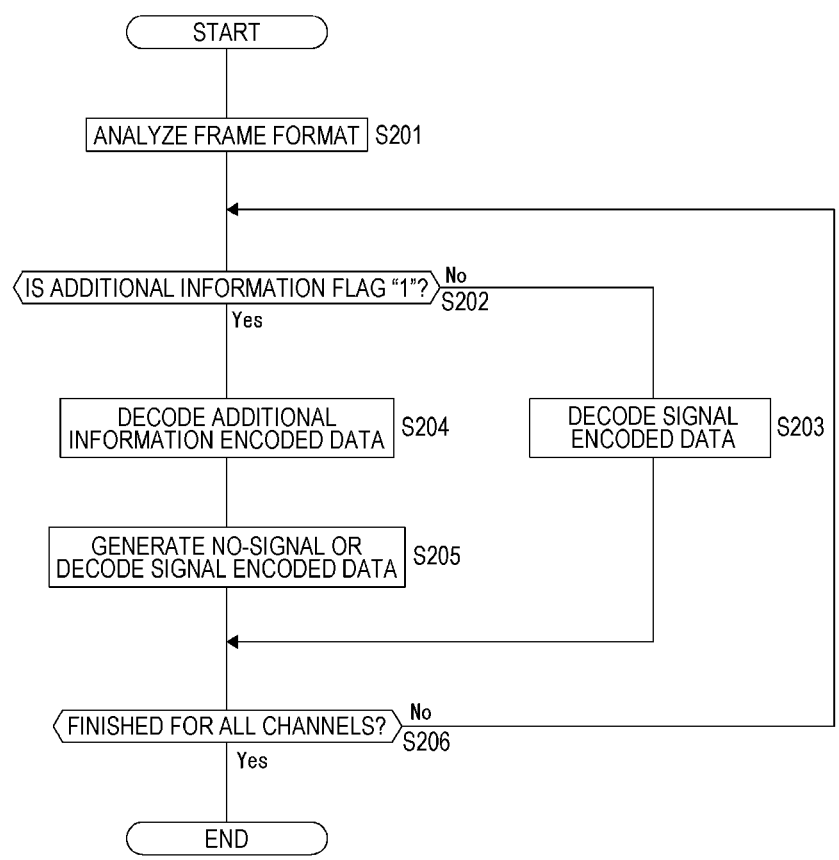

FIG. 18 illustrates a flowchart of decoding processing for the audile/tactile encoded data D1 for one frame, which is executed in the configuration of the decoding unit 43 illustrated in FIG. 17. That is, in the decoding processing, a bit stream for one frame is decoded to obtain a signal and additional information.

In step S201, the decoding unit 43 analyzes the input audile/tactile encoded data D1 on the basis of the encoded data format to obtain the channel configuration ID 132, the frame size 133, and each channel data 140.

Then, the decoding unit 43 performs processing of steps S202 to S205 for each channel data.

In step S202, the decoding unit 43 determines whether or not the additional information flag 141 is "1".

If the additional information flag 141 is "1", the decoding unit 43 proceeds to step S204. If the additional information flag 141 is not "1", the decoding unit 43 proceeds to step S203.

In step S203, the decoding unit 43 decodes the signal encoded data (vibration signal encoded data and audio signal encoded data).

In step S204, the decoding unit 43 reads out the additional information encoded data from the byte position indicated by the additional information recording start position 142 for the additional information designated by the additional information ID 143, and decodes the additional information encoded data.

In step S205, the decoding unit 43 performs processing for generating a non-signal in which all time signals are set to 0 as the signal encoded data and decoding processing of the signal encoded data.

For example, when the vibration signal of the frame is set as the imperceptible section and the entire section of the vibration signal is set as the additional information, the vibration signal is generated as a non-signal in which the entire signal is set to zero. In contrast, in a case where the additional information is inserted as the section of the surplus area of the vibration signal encoded data, the vibration signal encoded data exists, and therefore the vibration signal encoded data is decoded. In any of these cases, the audio signal encoded data is decoded.

In step S206, whether or not processing of all the channels has been completed is determined.

The decoding unit 43 ends the decoding processing of one frame if processing for all the channels is completed, and if there is a remaining channel, proceeds to step S202 to perform processing for one channel among unprocessed channels.

<12. Conclusion and Modification Examples>

According to the above embodiment, the following effects can be obtained.

In the embodiment, in a case where a bit stream of transmission data obtained by multiplexing a plurality of signals including at least a tactile signal is generated, a signal transmission unrequired section of the tactile signal, that is, a section of a surplus area or an imperceptible section is determined, and in a case where a signal transmission unrequired section exists, a bit stream in which additional information other than the tactile signal is inserted into the signal transmission unrequired section is generated.

As a result of this, the additional information can be transmitted without degrading the quality of the signal. That is, the additional information can be transmitted without unnecessarily reducing the information amount of the original audio signal or tactile signal or increasing the compression rate.

In addition, it is not necessary to provide an extra channel or the like for transmitting the additional information.

Note that the signal transmission unrequired section does not have to be one in one frame, for example, and may be divided into a plurality of sections.

Further, the additional information in one unit is not limited to be inserted into one continuous signal transmission unrequired section, and may be divided and inserted into a plurality of signal transmission unrequired sections.

In the embodiment, the imperceptible section in which the tactile signal is determined to be imperceptible has been described as an example of the signal transmission unrequired section.

In the first place, the tactile signal does not need to be transmitted in a section where the tactile signal is a non-signal or when the amplitude level is such a low level as a predetermined value or less and cannot be perceived by a person. Therefore, by setting such a section as a signal transmission unrequired section used for insertion of the additional information, the additional information can be transmitted without hindering transmission of the original tactile signal.

In the embodiment, a bit section that has become a surplus area as a result of encoding the tactile signal has been described as an example of the signal transmission unrequired section.

At the time of encoding a tactile signal, there is a case where the encoded data is generated at a small data amount with respect to the data length of the minimum processing unit (for example, a frame) having a fixed length due to a difference in encoding efficiency. In that case, the surplus area is usually used as padding or the like. The bit section serving as the surplus area is set as the signal transmission unrequired section. By using such a section for insertion of the additional information, the additional information can be transmitted without hindering transmission of the original tactile signal.

Note that, by employing a configuration in which the determination of the signal transmission unrequired section is performed multiple times per frame as in the example of FIG. 16, it becomes easier to obtain the additional information insertion opportunity. That is, by employing a configuration in which both the imperceptible section and the bit section serving as the surplus area are each determined, it becomes easier to insert the additional information.

In the embodiment, an example has been described in which the additional information inserted into the signal transmission unrequired section is encoded data of another signal to be multiplexed with the tactile signal in the minimum processing unit (for example, the next frame) that is at a later time point in the time axis direction than the minimum processing unit (frame) to which the signal transmission unrequired section corresponds.

For example, as in the example described with reference to FIG. 11, by setting the audio encoded data of the next frame as the additional information, it becomes possible to prevent sound interruption at the time of occurrence of packet loss due to deterioration in the communication condition. In particular, the interruption of the reproduced sound gives a great sense of discomfort to the end user, and thus the effect that the reproduced sound can be continued even if there is packet loss is great.

That is, inserting the encoded data of another signal of a frame of a later time point into the signal transmission unrequired section of the tactile signal is effective for improving the reproduction quality at the time of packet loss or the like. The other signal to be inserted is not limited to an audio signal, and may be an image signal, a text signal, or the like.

In the embodiment, an example in which the additional information is text data or image data has been described.

For example, text data or image data for presenting some information is inserted into the signal transmission unrequired section of the tactile signal. As a result of this, text data and image data can be transmitted without conforming to a special standard. For example, as illustrated in FIG. 12, it is possible to easily display characters and images by the wearable speaker 110, the television device 123, or the like to present information to the end user.

In the embodiment, an example in which the additional information is correction data of a position or time has been described.

For example, data for position correction, time correction, or the like of the device on the end user side is inserted into the signal transmission unrequired section of the tactile signal in advance.

As a result of this, the correction data of the position information or the time information can be transmitted without conforming to a special standard. For example, it becomes also possible to transmit the correction data to the device on the end user side such as the wearable speaker 110 or the television device 123 in FIG. 13 to execute time correction or position correction.

In the embodiment, an example in which the tactile signal and the audio signal are multiplexed has been described, but this is not limiting as a matter of course. For example, in a case where a video signal and a tactile signal are multiplexed as the vibration-incorporating video content CT or the like, or in a case where both the audio signal and the video signal are multiplexed with the tactile signal, the signal transmission unrequired section in the tactile signal can be used for transmission of the additional information.

Since the audio signal or the video signal is usually a signal indicating continuous sound or image information, it becomes possible to transmit the additional information without interrupting continuous sound or video information by transmitting the additional information using the signal transmission unrequired section on the tactile signal side.

Note that another tactile signal can be considered as another signal to be multiplexed with the tactile signal. That is, in a case of multiplexing tactile signals of a plurality of channels, inserting additional information into a signal transmission unrequired section of at least one of the tactile signals can be considered.

Further, it is not limited to a video signal as a moving image, and it can also be applied to a case of multiplexing a still image signal with a tactile signal.

The encoding device 14 (encoding unit 23) according to the embodiment includes the signal encoding unit 72 that encodes each of a plurality of signals including at least a tactile signal, the additional information encoding unit 73 that determines a signal transmission unrequired section in encoded data of the tactile signal and encodes additional information other than the tactile signal and inserts the encoded additional information into the signal transmission unrequired section in a case where there is the signal transmission unrequired section, and the multiplexing unit 74 that generates transmission data obtained by multiplexing a plurality of pieces of encoded data including the encoded data of the tactile signal to which the additional information has been inserted (see FIG. 8).

As a result of this, the encoding device 14 can generate transmission data obtained by multiplexing a plurality of signals including the tactile signal after inserting the additional information into the signal transmission unrequired section of the tactile signal.

In addition, presence/absence determination information indicating presence/absence of the additional information is added to the transmission data.

For example, as illustrated in FIGS. 14 and 15, the additional information flag 141 is provided as information indicating whether or not the additional information is included in the encoding format of the frame which is the minimum processing unit.

This makes it possible to easily and accurately determine whether or not the additional information is included in the frame at the time of decoding.

The decoding device 19 (decoding unit 43) according to the embodiment includes the demultiplexing unit 62 that demultiplexes the transmission data obtained by multiplexing encoded data of a plurality of signals including at least a tactile signal, the additional information determination unit 63 that determines whether or not the additional information is included in the encoded data of the tactile signal obtained by the demultiplexing, and the additional information encoded data decoding unit 65 that obtains the additional information by decoding the encoded data of the additional information in a case where it is determined that the additional information is included (see FIG. 17).

As a result of this, in a case where the additional information is inserted into the signal transmission unrequired section of the tactile signal, the decoding device 19 can decode the encoded data of the additional information.

Further, the additional information determination unit 63 can easily and accurately determine whether or not the additional information is included in the frame by determining whether or not the additional information is included by using the additional information flag 141 which is the presence/absence determination information.

Note that the additional information may be information including text data, audio data, moving image data, still image data, tactile data, vibration data, correction data of time and position, control data, and the like in a complex manner.

In addition, the signal transmission unrequired section may exist as a plurality of sections in one frame. In this case, one unit of the additional information may be divided and inserted into a plurality of sections.

Further, one unit of the additional information may be divided and inserted into signal transmission unrequired sections of a plurality of frames.

As the technology of the present disclosure, a program for causing an information processing apparatus to execute encoding processing and decoding processing including bit stream generation described as the embodiment is also assumed.

For example, the program causes the information processing apparatus to execute the encoding processing in FIG. 16 and the decoding processing in FIG. 18.

According to such a program, the encoding device 14 and the decoding device 19 described above can be realized by, for example, a portable terminal device, a personal computer, or another device capable of executing information processing.

Such a program for realizing the encoding device 14 and the decoding device 19 can be recorded in advance in an HDD as a recording medium incorporated in a device such as a computer device, a ROM in a microcomputer including a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed from a removable recording medium to a personal computer or the like, or can be downloaded from a download site via a network such as a local area network (LAN) or the Internet.

Furthermore, such a program is suitable for providing the encoding device 14 and the decoding device 19 of the embodiment in a wide range. For example, by downloading the program to a portable terminal device such as a smartphone or a tablet, a mobile phone, a personal computer, a gaming device, a video device, a personal digital assistant (PDA), or the like, the smartphone or the like can be caused to function as the encoding device 14 and the decoding device 19 of the present disclosure.

Note that the effects described in the present description are merely shown as examples and not limiting, and there may also be other effects.

Note that the present technology can also employ following configurations.

(1)

A bit stream generation method for generating a bit stream of transmission data in which a plurality of signals including at least a tactile signal is multiplexed, the bit stream generation method including:

determining a signal transmission unrequired section of the tactile signal and, in a case where the signal transmission unrequired section exists, generating the bit stream in which additional information other than the tactile signal is inserted into the signal transmission unrequired section.

(2)

The bit stream generation method according to (1) described above, in which the signal transmission unrequired section is a section where the tactile signal is determined to be an imperceptible signal.

(3)

The bit stream generation method according to (1) or (2) described above, in which the signal transmission unrequired section is a bit section that has become a surplus area as a result of encoding the tactile signal.

(4)

The bit stream generation method according to any one of (1) to (3), in which the additional information inserted into the signal transmission unrequired section is encoded data of another signal to be multiplexed with the tactile signal in a minimum processing unit that is at a later time point in a time axis direction than a minimum processing unit to which the signal transmission unrequired section corresponds.

(5)

The bit stream generation method according to any one of (1) to (4), in which the additional information is text data or image data.

(6)

The bit stream generation method according to any one of (1) to (5), in which the additional information is correction data of a position or time.

(7)

The bit stream generation method according to any one of (1) to (6), in which a signal multiplexed with the tactile signal is an audio signal or an image signal.

(8)

An encoding device including:

a signal encoding unit that encodes each of a plurality of signals including at least a tactile signal;

an additional information encoding unit that determines a signal transmission unrequired section in encoded data of the tactile signal and encodes additional information other than the tactile signal and inserts the encoded additional information into the signal transmission unrequired section in a case where the signal transmission unrequired section exists; and a multiplexing unit that generates transmission data obtained by multiplexing a plurality of pieces of encoded data including the encoded data of the tactile signal to which the additional information has been inserted.

(9)

The encoding device according to (8) described above, in which presence/absence determination information indicating presence/absence of the additional information is added to the transmission data.

(10)

A decoding device including:

a demultiplexing unit that demultiplexes transmission data obtained by multiplexing encoded data of a plurality of signals including at least a tactile signal;

an additional information determination unit that determines whether or not additional information is included in encoded data of the tactile signal obtained by the demultiplexing; and an additional information encoded data decoding unit that obtains the additional information by decoding the encoded data of the additional information in a case where it is determined that the additional information is included.

(11)

The decoding device according to (10) described above, in which presence/absence determination information indicating presence/absence of the additional information is added to the transmission data, and the additional information determination unit determines whether or not the additional information is included by using the presence/absence determination information.

In addition, the present technology can also employ the following configuration.

(12)

A program that causes an information processing apparatus to execute processing for, when generating a bit stream of transmission data in which a plurality of signals including at least a tactile signal is multiplexed, determining a signal transmission unrequired section of the tactile signal and, in a case where the signal transmission unrequired section exists, generating the bit stream in which additional information other than the tactile signal is inserted into the signal transmission unrequired section.

REFERENCE SIGNS LIST 11 audile/tactile recording system
12 audio recording device
13 tactile recording device
14 encoding device
15 audile/tactile transmission device
16 audile/tactile reproducing system
17 sound reproducing device
18 tactile reproducing device
23 encoding unit
28 additional information input unit
43 decoding unit
61 encoded data input unit
62 demultiplexing unit
63 additional information determination unit
64 signal encoded data decoding unit
65 additional information encoded data decoding unit
66 signal output unit
67 additional information processing unit
71 signal input unit
72 signal encoding unit
73 additional information encoding unit
74 multiplexing unit
110 wearable speaker
123 television device
130 frame data
140 channel data
141 additional information flag
142 additional information recording start position
143 additional information ID
144 signal encoded data
145 additional information encoded data

The invention claimed is:

1. A bit stream generation method, comprising:
   determining a signal transmission unrequired section of a tactile signal, and
   generating, based on determination that the signal transmission unrequired section exists in the tactile signal, a bit stream of data transmission which includes additional information different from the tactile signal in the signal transmission unrequired section, wherein
   the signal transmission unrequired section corresponds to a surplus area of a frame of the tactile signal, the frame corresponds to an encoding result of the tactile signal, the bit stream includes a plurality of signals that is multiplexed, the plurality of signals includes at least the tactile signal, the additional information in the signal transmission unrequired section includes a first minimum processing unit of the tactile signal, the first minimum processing unit includes data of a second minimum processing unit of encoded data of a signal to be multiplexed with the tactile signal, the second minimum processing unit is at a later time point in a time axis direction than the first minimum processing unit, the plurality of signals includes the signal, and the signal is different from the tactile signal.

2. The bit stream generation method according to claim 1, wherein the signal transmission unrequired section is a section where the tactile signal is an imperceptible signal.

3. The bit stream generation method according to claim 1, wherein the additional information is at least one of text data or image data.

4. The bit stream generation method according to claim 1, wherein the additional information is correction data of at least one of a position or time.

5. The bit stream generation method according to claim 1, wherein the signal is at least one of an audio signal or an image signal.

6. An encoding device, comprising:
a signal encoding unit configured to encode each of a plurality of signals including at least a tactile signal;
an additional information encoding unit configured to:
  determine a signal transmission unrequired section in first encoded data of the tactile signal,
  encode additional information different from the tactile signal, and
  insert, based on determination that the signal transmission unrequired section exists in the first encoded data of the tactile signal, the encoded additional information into the signal transmission unrequired section, wherein
    the signal transmission unrequired section corresponds to a surplus area of a frame of the tactile signal,
    the frame corresponds to an encoding result of the tactile signal,
    the additional information in the signal transmission unrequired section includes a first minimum processing unit of the tactile signal,
    the first minimum processing unit includes data of a second minimum processing unit of second encoded data of a signal to be multiplexed with the tactile signal,
    the second minimum processing unit is at a later time point in a time axis direction than the first minimum processing unit,
    the plurality of signals includes the signal, and
    the signal is different from the tactile signal; and
a multiplexing unit configured to:
  multiplex a plurality of encoded data corresponding to each of the plurality of signals, wherein the plurality of encoded data includes the second encoded data, and
  generate transmission data based on the multiplexed plurality of encoded data, wherein
    the plurality of encoded data includes at least the first encoded data of the tactile signal which includes the encoded additional information.

7. The encoding device according to claim 6, wherein
the additional information encoding unit is further configured to add presence/absence determination information to the transmission data, and
the presence/absence determination information indicates presence/absence of the additional information in the transmission data.

8. A decoding device, comprising:
a demultiplexing unit configured to demultiplex transmission data, wherein the transmission data includes multiplexed encoded data of a plurality of signals including at least a tactile signal;
an additional information determination unit configured to determine presence of additional information in first encoded data of the tactile signal; and
an additional information encoded data decoding unit configured to obtain, based on determination that the additional information is present in the first encoded data of the tactile signal, the additional information by decoding second encoded data of the additional information, wherein
  the additional information is present in a surplus area of a frame of the first encoded data of the tactile signal,
  the frame corresponds to an encoding result of the tactile signal,
  the additional information in the surplus area includes a first minimum processing unit of the tactile signal,
  the first minimum processing unit includes data of a second minimum processing unit of third encoded data of a signal multiplexed with the tactile signal,
  the second minimum processing unit is at a later time point in a time axis direction than the first minimum processing unit,
  the plurality of signals includes the signal,
  the signal is different from the tactile signal, and
  the multiplexed encoded data includes the first encoded data, the second encoded data, the third encoded data.

9. The decoding device according to claim 8, wherein
the transmission data includes presence/absence determination information indicating presence/absence of the additional information, and
the additional information determination unit is further configured to determine a presence of the additional information based on the presence/absence determination information.

* * * * *